United States Patent
Brkovic

(10) Patent No.: US 7,102,898 B2
(45) Date of Patent: Sep. 5, 2006

(54) ISOLATED DRIVE CIRCUITRY USED IN SWITCH-MODE POWER CONVERTERS

(75) Inventor: Millvoje S. Brkovic, Carlsbad, CA (US)

(73) Assignee: DI/DT, Inc., Carlsbad, CA (US)

( * ) Notice: Subject to any disclaimer, the term of this patent is extended or adjusted under 35 U.S.C. 154(b) by 0 days.

(21) Appl. No.: 10/061,662

(22) Filed: Feb. 1, 2002

(65) Prior Publication Data

US 2002/0141206 A1 Oct. 3, 2002

Related U.S. Application Data

(60) Provisional application No. 60/265,714, filed on Feb. 1, 2001.

(51) Int. Cl.
*H02M 3/335* (2006.01)
*H02H 7/122* (2006.01)

(52) U.S. Cl. .............................. 363/19; 363/17; 363/23; 363/56.05; 363/98

(58) Field of Classification Search ............ 363/17, 363/22, 23, 56.02, 56.05, 56.03, 55, 98, 132, 363/19
See application file for complete search history.

(56) References Cited

U.S. PATENT DOCUMENTS

| | | | |
|---|---|---|---|
| 4,591,964 A | 5/1986 | Kemstedt | 363/24 |
| 4,884,186 A | 11/1989 | Small | 363/132 |
| 5,198,969 A | 3/1993 | Redl et al. | 363/17 |
| 5,274,543 A | 12/1993 | Loftus, Jr. | |
| 5,353,212 A | 10/1994 | Loftus, Jr. | 363/17 |
| 5,590,032 A * | 12/1996 | Bowman et al. | 363/15 |
| 5,726,869 A * | 3/1998 | Yamashita et al. | 363/97 |
| 5,870,299 A | 2/1999 | Rozman | |
| 5,880,939 A | 3/1999 | Sardat | 363/17 |
| 5,907,481 A | 5/1999 | Svärdsjö | |
| 5,999,432 A | 12/1999 | Nilssen | 363/132 |
| 6,038,148 A | 3/2000 | Farrington et al. | |
| 6,069,802 A * | 5/2000 | Priegnitz | 363/97 |
| 6,111,769 A | 8/2000 | Zhang et al. | 363/127 |
| 6,169,683 B1 | 1/2001 | Farrington | 363/127 |
| 6,185,114 B1 * | 2/2001 | Matsumotot et al. | 363/127 |
| RE37,510 E * | 1/2002 | Bowman et al. | 363/127 |
| 6,504,739 B1 | 1/2003 | Phadke | 363/127 |

FOREIGN PATENT DOCUMENTS

| | | |
|---|---|---|
| DE | 4035969 A1 | 8/1991 |
| DE | 4327073 C1 | 10/1994 |
| EP | 0957568 A2 | 11/1999 |
| JP | 58136137 | 8/1983 |
| JP | 03128673 | 5/1991 |
| JP | 10215584 | 8/1998 |
| WO | WO 93/19516 | 9/1993 |

\* cited by examiner

*Primary Examiner*—Bao Q. Vu
(74) *Attorney, Agent, or Firm*—Polster Lieder Woodruff & Lucchesi, L.C.

(57) ABSTRACT

A drive transformer and associated circuitry for providing power and appropriate delays to primary switches and synchronous rectifiers in switch-mode power converters. The circuitry takes advantage of the leakage inductances of the drive transformer windings as well as the input capacitance of the primary switches (MOSFETs) to provide the necessary delays. No separate circuitry is needed to provide such delays, thereby providing reliability. Exemplary embodiments further disclose means to disable or enable the primary winding from a condition sensed on the secondary side even with a control and feedback circuit located on the secondary side.

33 Claims, 12 Drawing Sheets

ISOLATED DRIVE CIRCUITRY USED IN SWITCH-MODE POWER CONVERTERS

CROSS REFERENCE TO RELATED APPLICATION

This is a non-provisional application based on provisional application Ser. No. 60/265,714 filed Feb. 1, 2001.

BACKGROUND

1. Field of the Invention

This invention relates generally to switch-mode power converters and more particularly it provides a simple drive circuit with an enable function providing isolation and having high performance in topologies using synchronous rectification.

2. Background Discussion

A switch-mode power converter is a circuit that uses an inductor, a transformer, or a capacitor, or some combination, as energy storage elements to transfer energy from an input source to an output load in discrete pulses. Additional circuitry is added to maintain a constant voltage within the load limits of the circuit. The basic circuit can be configured to step up (boost), step down (buck), or invert output voltage with respect to input voltage. Using a transformer allows the output voltage to be electrically isolated from the input voltage.

Switch-mode converters have changed very little over the past 15 years, most using Schottky diodes to rectify their output. However, newer challenges in the industry for dc/dc power supply designers demand lower voltages required by digital circuits, and also higher frequencies. Since converters using Schottky diodes for rectification experience a large forward voltage drop relative to the output voltage, their efficiency is generally relatively low. Lower efficiencies result in more dissipated heat that has to be removed using a heat sink, which takes up space. A dramatic increase in converter efficiency has been realized by replacing the Schottky diodes with "synchronous rectifiers" configured in practice with MOSFET transistors. Synchronous rectifiers are not new, but they have previously been too expensive to justify, primarily due to high ON resistance. However, as costs fall and performance improves, synchronous rectifiers have quickly become a viable component, especially for low voltage converters.

Using self-driven synchronous rectifiers in various converter topologies is very attractive and popular because there is no need for additional isolation between drive signals. It has the advantage of simplicity. However, it has the disadvantage of cross conduction between synchronous rectifiers and primary side switches, as well as reverse recovery current of the parasitic anti-parallel diode of the MOSFET used for synchronous rectification. In order to minimize these shoot-through currents, an inductance (or saturable inductor) is usually placed in series with the synchronous rectifier. While this may be a solution for lower switching frequencies, for example, 100 kHz–200 kHz, it is not suitable for higher switching frequencies (200 kHz and above). Especially at switching frequencies of 300–400 kHz this is not an optimum solution. The reason for this is that increased inductance in series with a synchronous rectifier reduces the effective duty cycle on the secondary side of the power transformer due to slower di/dt of the secondary current. As a result, more voltage head-room is required in the power transformer implying a smaller effective turns ratio and consequently a lower efficiency. A second reason why self-driven synchronous rectification is not suitable for higher switching frequencies is the potential loss due to reverse recovery current in the body diode of the synchronous rectifiers (MOSFETs) and increased turn-on current in the primary side switches (usually MOSFETs).

A previous improvement has been to use direct drive for synchronous rectifiers with well controlled timing between drive signals for the main switches (primary side) and synchronous rectifiers (secondary side). This solution thus allows for very efficient operation of the synchronous rectifiers even at high switching frequencies. Yet another benefit of direct driven synchronous rectifiers is that the drive voltage (gate to source) is constant and independent of input voltage, which further improves efficiency over a wide input voltage range.

An example of the above prior art is set forth in U.S. Pat. No. 5,907,481. However, the invention in this patent provides only signals for drivers for the primary side switches and uses additional logic for delaying drive waveforms (R-C-D networks and logic gates). The '481 apparatus uses an isolation drive transformer for a logic signal only to control operation of the primary switches. It does not use a drive transformer to power the primary switches but rather uses a separate circuit to provide power and delays.

It is necessary to provide delays between drive signals for primary side switches and secondary side switches (synchronous rectifiers) in order to avoid cross conduction (simultaneous conduction which would result in a short circuit). When power converters are operated at lower switching frequencies (for example, 100 kHz), cross conduction of the switches can be acceptable since the percentage of the time during which cross conduction occurs relative to the switching period is small (typically about 40 ns/10 μs). Also, a transformer designed to operate at lower frequencies will have a larger leakage inductance, which will reduce cross conduction currents. In the case of higher switching frequencies (above 100 kHz), the cross conduction ratio becomes more unacceptable (about 40 ns/2 μs for a 500 kHz switching frequency). Also for higher switching frequencies, the leakage inductance in the transformer as well as in the entire power stage should be minimized for higher efficiency. Consequently, currents due to cross conduction time can become significant and degrade overall converter efficiency and increase heating of the power components significantly.

SUMMARY OF THE INVENTION

According to an embodiment of the invention, one drive transformer is used for providing the proper delays in drive waveforms as well as power for driving primary switches, particularly high side switches in a half-bridge topology. The leakage inductance of the drive transformer is used to delay turn-on of the main switches (primary side) while turn-off is with no significant delay. The number of windings on the drive transformer is minimized and varies from three to four depending on where the switch conduction control circuit is referenced. In a half-bridge converter, having the control circuit (pulse width modulated (PWM) type, for example) referenced to the output of the converter, there are three windings: (1) for the control signal and providing proper waveforms for driving synchronous rectifiers; (2) for driving the bottom primary switch; and (3) for driving the top primary switch. If the control circuit is referenced to the input of the converter there are four windings: (1) for the control signal; (2) for providing proper waveforms for driving synchronous rectifiers; (3) for driving the bottom primary switch; and (4) for driving the top primary switch. It is an additional object of the invention to provide means to enable/disable the module due to a condition sensed on either the primary (input) or secondary (output) side via a controller, which maybe located on either the primary or secondary side.

BRIEF DESCRIPTION OF THE DRAWING

The objects, advantages and features of the invention will be more clearly perceived from the following detailed description, when read in conjunction with the accompanying drawing, in which.

DETAILED DESCRIPTION OF THE PREFERRED EMBODIMENTS

Figure 1:
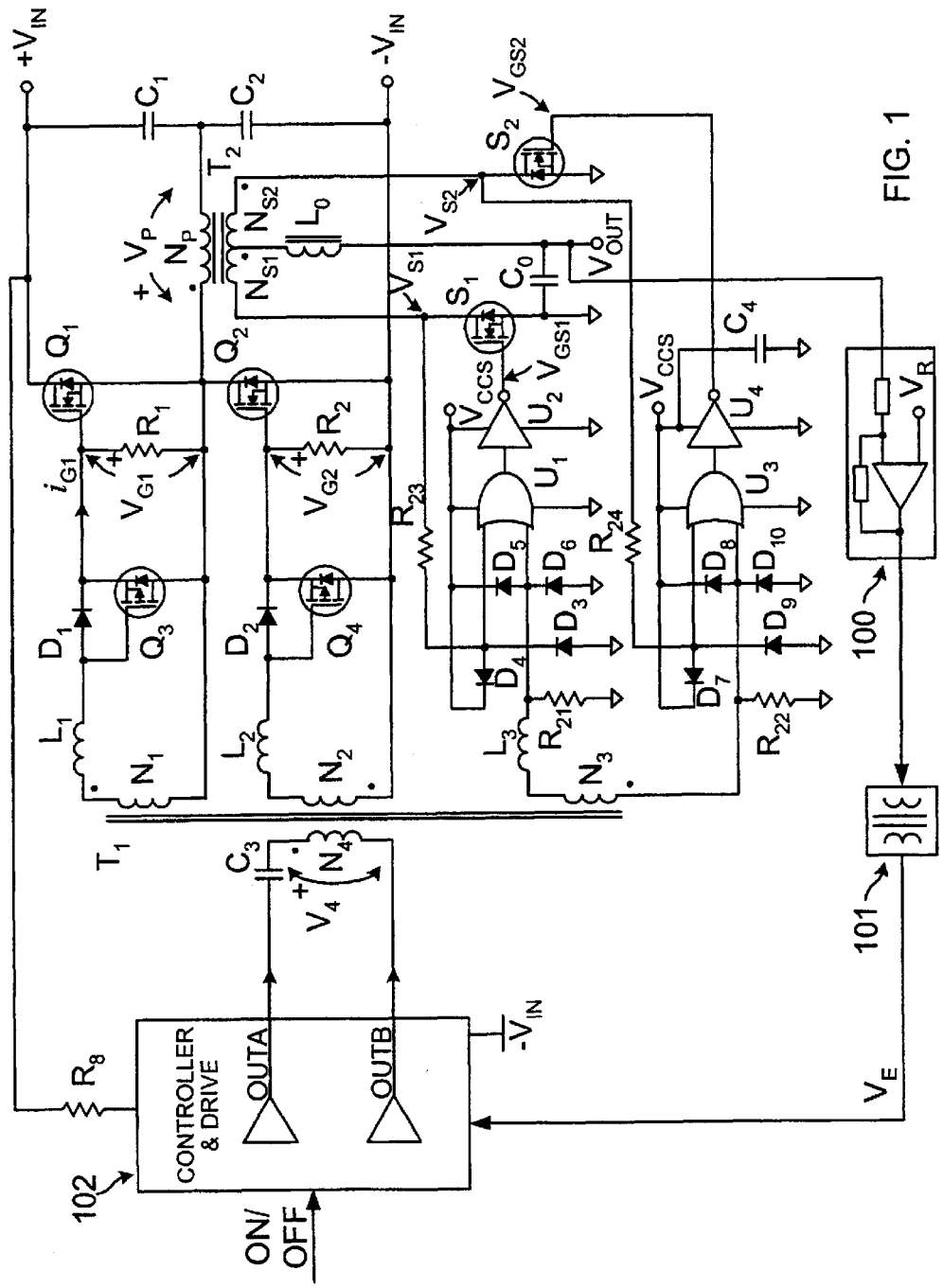
FIG. 1 is a circuit diagram of an embodiment of the invention using a half-bridge converter with control and drive circuit referenced to the input side of the converter.

With reference now to FIG. 1, there is shown an embodiment of the invention using a half-bridge converter. Primary switches $Q_1$, $Q_2$ (also called primary controllable power switches), synchronous rectifiers $S_1$ and $S_2$, capacitors $C_1$, $C_2$ and $C_0$, power isolation transformer $T_2$ and inductor $L_0$ form a half-bridge dc-to-dc converter. The invention could also be embodied in other topologies including ac-to-dc, dc-to-ac and others. Input voltage $V_{IN}$ is split with capacitors $C_1$ and $C_2$. One side of primary winding $N_P$ of transformer $T_2$ is connected to the common connection of capacitors $C_1$ and $C_2$ while the second end is connected to the common point of switches $Q_1$ and $Q_2$. Two secondary windings $N_{S1}$ and $N_{S2}$ are preferably identical and are connected in series. The common point of these windings $N_{S1}$ and $N_{S2}$ is connected to one end of output inductor $L_0$, and the second end of inductor $L_0$ is connected to capacitor $C_0$ that is connected across the output of the converter. The second end of winding $N_{S1}$ is connected to synchronous rectifier (switch) $S_1$ while the second end of winding $N_{S2}$ is connected to synchronous rectifier (switch) $S_2$. The polarity of the windings of transformer $T_2$ is chosen such that when switch $Q_1$ is on, synchronous rectifier $S_1$ is on and $S_2$ is off. In contrast, when switch $Q_2$ is on, synchronous rectifier $S_1$ is off and $S_2$ is on. When both $Q_1$ and $Q_2$ are off, $S_1$ and $S_2$ are both on. Primary switches $Q_1$ and $Q_2$ are both exemplified as MOSFETs, but may also be realized as IGBTs (isolated gate bipolar transistors). This particular embodiment is explained as a hard switching half-bridge converter with split secondary windings. The invention is also applicable to derivatives of a half-bridge converter, such as but not limited to, a half bridge converter with a single secondary winding employing a current doubler on the output.

Output voltage $V_{OUT}$ is compared with reference voltage $V_R$ in block 100, which is typically an error amplifier. The output of block 100 is fed into isolation circuit (usually an opto-coupler or isolation transformer) 101 and error signal $V_E$ is fed into block 102. Controller and drive block 102 contains switch conduction control circuitry that comprises a feedback and controller (PWM type, for example), two driver stages generating out-of-phase outputs OUTA and OUTB, and ON/OFF logic. This block can contain additional protection features very often found in converters, but they are not relevant for the purpose of the present description, and are thus omitted. Driver outputs OUTA and OUTB are capable of driving switches $Q_1$ and $Q_2$ as well as drive transformer $T_1$. Note that in FIG. 1, controller 102 and OUTA and OUTB drivers are referenced to $-V_{IN}$, and therefore to the input of the converter.

Drive transformer $T_1$ has four windings $N_1$, $N_2$, $N_3$ and $N_4$. Winding $N_4$ is driven from controller 102 via OUTA and OUTB and capacitor $C_3$, in series with winding $N_4$, is a DC blocking capacitor. Winding $N_1$ is connected at one end to the source of transistor $Q_1$ and the second end is connected to the gate of $Q_1$ via series diode $D_1$. Transistor (also called control switch) $Q_3$, shown as a p-channel MOSFET, is connected across the gate and source of $Q_1$ with its gate connected to the anode of diode $D_1$. Resistor $R_1$ is used to increase the noise immunity of transistor $Q_1$ when the voltage across winding $N_1$ is zero. Similarly, winding $N_2$ is connected with one end to the source of transistor $Q_2$ and the second end is connected to gate of transistor $Q_2$ via series diode $D_2$. Transistor $Q_4$, also shown as a p-channel MOSFET, is connected across the gate and source of $Q_2$ with its gate connected to anode of diode $D_2$. Resistor $R_2$ is used to increase the noise immunity of $Q_2$ when voltage across winding $N_2$ is zero.

Winding $N_3$ is connected to the drive circuitry for synchronous rectifiers $S_1$ and $S_2$. The ends of winding $N_3$ are connected via respective resistors $R_{21}$ and $R_{22}$ to the secondary side ground and to one input of two input logic OR gates $U_1$ and $U_3$. It is assumed that each input of gates $U_1$ and $U_3$ has protection diodes from ground to input and from input to supply voltage $V_{CCS}$. If logic gates without these diodes are used, than external diodes need to be added for proper operation of the circuit (as in FIG. 1, external diodes $D_3$–$D_{10}$). Supply voltage $V_{CCS}$ is usually generated from the windings of power transformer $T_2$ or a separate bias circuit from the primary side with the proper isolation. Drive transformer $T_1$ can provide the necessary supply voltage $V_{CCS}$ via winding $N_3$ and diodes $D_5$, $D_6$, $D_8$ and $D_{10}$ as is described herein. The second input of logic gate $U_1$, is connected through resistor $R_{23}$ to the drain of synchronous rectifier $S_1$, while the second input of logic gate $U_3$ is connected through resistor $R_{24}$ to the drain of synchronous rectifier $S_2$. These two inputs provide break-before-make turn-on of both synchronous rectifiers $S_1$ and $S_2$ as is detailed herein. The voltage on the inputs of logic gates $U_1$ and $U_3$ is clamped to $V_{CCS}$ with diodes $D_4$ and $D_7$, respectively. The output of logic gate $U_1$ is connected to the input of inverting driver $U_2$, which drives synchronous rectifier $S_1$, while the output of logic gate $U_3$ is connected to the input of inverting driver $U_4$, which drives synchronous rectifier $S_2$.

Inductances $L_1$ and $L_2$ are the leakage inductances associated with windings $N_1$ and $N_2$, respectively, of transformer $T_1$. These two inductances are carefully designed and made larger than usual in order to delay turn-on of switches $Q_1$ and $Q_2$. Adjusting inductances is relatively simple when the transformer windings are formed on a printed circuit board (PCB), especially on multi-layer PCBs. In addition, repeatability and control in manufacturing are excellent. Typical values for these inductances are approximately 100 nH and higher. They are designed so that one-fourth of the period of oscillation caused by the input capacitance of switches $Q_1$ and $Q_2$ and leakage inductances of the windings ($L_1$ and $L_2$) is longer than the turn-off time of the secondary synchronous rectifying switches $S_1$ and $S_2$.

The leakage inductance $L_3$ of winding $N_3$ of the drive transformer is not critical since winding $N_3$ is loaded with high impedance load, also taking into consideration the input capacitance of logic gates $U_1$ and $U_3$ (5 pF–10 pF being typical). Thus inductance $L_3$ will not have significant impact on the rising and falling edges of the voltage waveforms across winding $N_3$ and consequently will not add any additional delay in turning off synchronous rectifiers $S_1$ and $S_2$.

Figure 2:
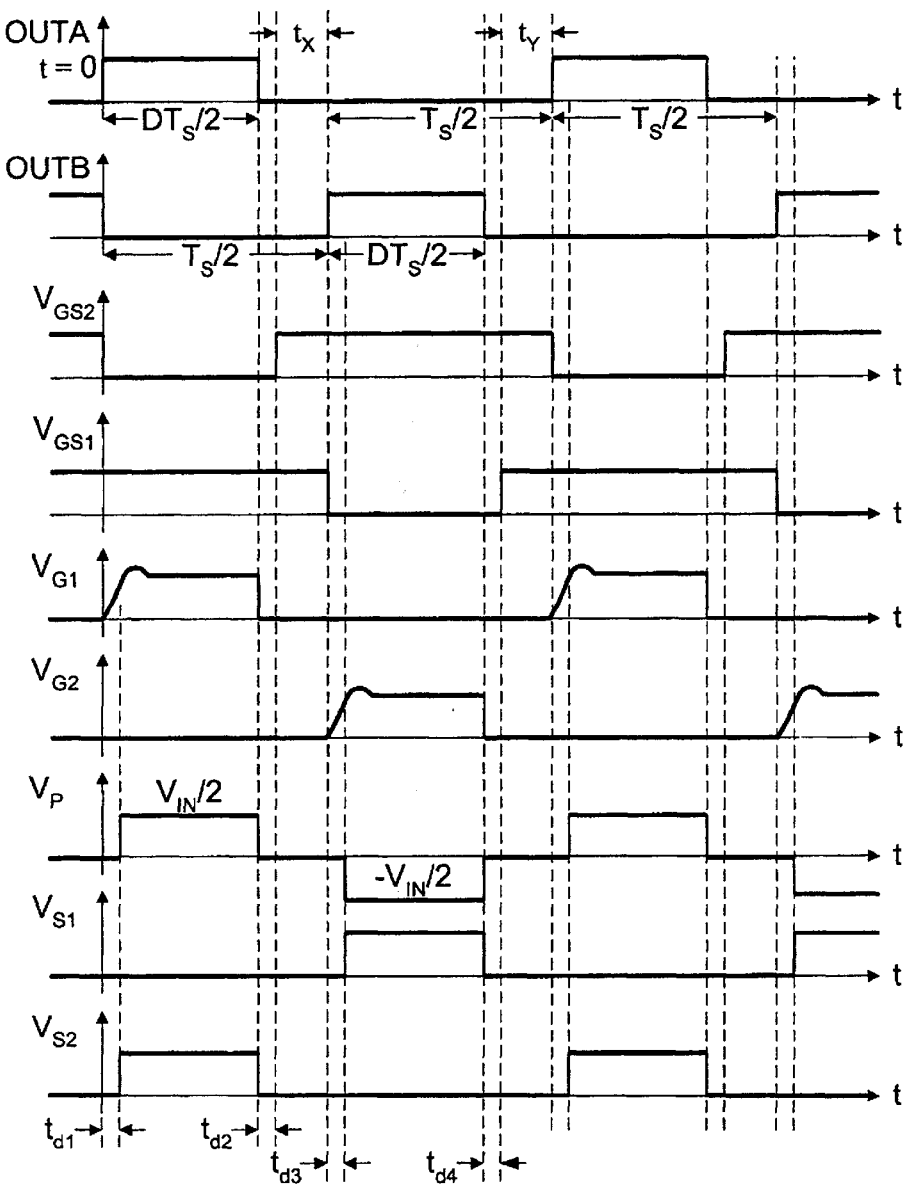
FIG. 2 shows the salient waveforms of embodiments of the invention, taken at several locations in the FIG. 1 circuit.

The salient waveforms are provided in FIG. 2 for circuit operation understanding. In these waveforms:

$t_{d1}$—time between turning-off synchronous rectifier $S_2$ and turning-on switch $Q_1$. This is determined by the leakage inductance $L_1$ of drive transformer $T_1$ and the input capacitance of primary switch $Q_1$.

$t_{d2}$—time delay between turning-off switch $Q_1$ and turning-on synchronous rectifier $S_2$. The drive voltage ($V_{GS2}$) of synchronous rectifier $S_2$ is applied when the voltage across $S_2$ ($V_{S2}$) is below the threshold of logic gate $U_3$. Resister $R_{24}$ and the input capacitance of logic gate $U_3$ provide fine tuning of the delay. During this time the output capacitance of $S_2$ is discharged with the output inductor current.

$t_{d3}$—time between turning-off synchronous rectifier $S_1$ and turning-on switch $Q_2$. It is determined by the leakage inductance $L_2$ of drive transformer $T_1$ and the input capacitance of primary switch $Q_2$. Usually, $td_1 \approx td_3$ in practice.

$t_{d4}$—time delay between turning-off switch $Q_2$ and turning-on synchronous rectifier $S_1$. The drive voltage for synchronous rectifier $S_1$ ($V_{GS1}$) is applied when the voltage across it, $V_{S1}$, reaches near zero value (threshold of logic gate $U_1$). Resistor $R_{23}$ and the input capacitance of logic gate $U_1$ provide fine tuning of this delay. The output c rectifier $S_1$ is discharged by the output inductor current during this time.

Usually, $t_{d2} \approx td_4$ in practice.

At t=0, OUTA becomes high, while OUTB is low. The voltage across the windings of $T_1$ is positive. Note that the dot next to one end of each winding of $T_1$ is used for reference and is now positive with respect to other side of the winding. Since the voltage across winding $N_3$ is positive, the output of $U_4$ goes high causing turn-off of primary switch $S_2$ with minimum delay. Note that the end of winding $N_3$ that is connected to the input of logic gate $U_1$ is clamped with an internal diode to the negative voltage equal to the forward voltage drop of the diode. The output of inverting driver $U_2$ is low and synchronous rectifier $S_1$ is still on. At the same time, positive voltage is applied across winding $N_1$, diode $D_1$ becomes forward biased and the input capacitance of transistor $Q_1$ begins charging in a resonant manner via leakage inductance $L_1$ of winding $N_1$. At $t=t_{d1}$, gate voltage $V_{G1}$ is positive and transistor $Q_1$ is fully on. Note that positive voltage across winding $N_2$ keeps transistor $Q_2$ off. The body diode of inverting driver $Q_4$ clamps negative voltage on the gate of $Q_2$ to near zero during time $DTs/2$ while $D_2$ is reverse biased. Clamping negative voltage on the gate of $Q_2$ during the off time is desirable in order to reduce gate drive losses. Positive voltage is applied across all windings of transformer $T_2$ during the time following $t_{d1}$ to the completion of DTS/2. The voltage across synchronous rectifier $S_2$ is also positive and $S_2$ is off. The output inductor current is supplied through winding $N_{S1}$ and synchronous rectifier $S_1$. At t=DTs/2, OUTA becomes low (OUTB is still low), winding $N_4$ is shorted and the voltages across the other three windings of $T_1$ are near zero. Transistor $Q_3$ is turned-on, diode $D_1$ is reverse biased, the input capacitance of transistor $Q_1$ is discharged very quickly via the ON resistance of $Q_3$ and gate voltage $V_{G1}$ rapidly drops to zero resulting in the turn-off of $Q_1$. The current through output inductor $L_0$ splits between synchronous rectifier $S_1$ and the body diode of $S_2$, which as a consequence has shorted the windings of transformer $T_2$. As soon as voltage across synchronous rectifier $S_2$ drops down to the logic zero threshold of logic gate $U_3$, the output of $U_3$ goes low (since the input connected to winding $N_3$ is zero) and synchronous rectifier $S_2$ is turned-on via driver $U_4$ (time interval $t_{d2}$). Both synchronous rectifiers $S_1$ and $S_2$ are on during the rest of the half of the switching period (Ts/2) and voltages across the windings of transformers $T_1$ and $T_2$ are zero (time interval $t_x$).

At t=Ts/2, OUTB goes high while OUTA is kept low and the voltage on the windings of $T_1$ becomes negative. Since the voltage across winding $N_3$ is negative, the voltage across resistor $R_{21}$ is positive and the output of logic gate $U_1$ goes high causing the output of driver $U_2$ to go low which turns-off synchronous rectifier $S_1$ with minimum delay. Note that the end of winding $N_3$ connected to the input of $U_3$ is clamped with an internal diode to the negative voltage equal to the forward voltage drop of the diode. Since both inputs of logic gate $U_3$ are at the low logic level, the output of $U_3$ is low, the output of driver $U_4$ is high and synchronous rectifier $S_2$ is still on. At the same time negative voltage is applied across winding $N_2$ (the end with no dot is more positive than the end with a dot), diode $D_2$ becomes forward biased and the input capacitance of transistor $Q_2$ starts to be charged in resonant manner via the leakage inductance $L_2$ of winding $N_2$. At $t=Ts/2+t_{d3}$, voltage $V_{G2}$ is high and transistor $Q_2$ is fully on. Note that the negative voltage across winding $N_1$, keeps transistor $Q_1$ off. The body diode of $Q_3$ clamps negative voltage across the gate of $Q_1$ to near zero, while diode $D_1$ is reverse biased. Clamping negative voltage on the gate of $Q_1$ during off-time is desirable in order to reduce gate drive losses. Positive voltage is applied across all windings of transformer $T_2$. The voltage across synchronous rectifier $S_1$ is also positive. During time $T_S/2+DT_S/2$ the output inductor current is supplied from the input through winding $N_{S2}$ and synchronous rectifier $S_2$.

At $t=T_S/2+DT_S/2$, OUTB becomes low (OUTA is still low), winding $N_4$ is shorted and the voltages across the other three windings of $T_1$ are near zero. Transistor $Q_4$ is turned-on, diode $D_2$ is reverse biased, the input capacitance of primary switch $Q_2$ is discharged very quickly via the ON resistance of $Q_4$ and voltage $V_{G2}$ rapidly drops to zero resulting in turn-off of transistor $Q_1$. The current through output inductor $L_0$ splits between synchronous rectifier $S_2$ and the body diode of $S_1$, which as a consequence has shorted the windings of transformer $T_2$. As soon as the voltage across $S_1$ drops down to the logic zero threshold of $U_1$, the output of $U_1$ goes low (since the input connected to resistor $R_{21}$ is zero) and synchronous rectifier $S_1$ is turned-on via driver $U_2$. The time interval between turning-off of $Q_2$ and turning-on $S_1$ is denoted as $t_{d4}$. Synchronous rectifiers $S_1$ and $S_2$ are on during the rest of the half of the switching period and the voltages across the windings of transformers $T_1$ and $T_2$ are zero (time interval $t_y$). At the end of time interval $t_y$, operation of the converter of FIG. 1 repeats.

Figure 3:
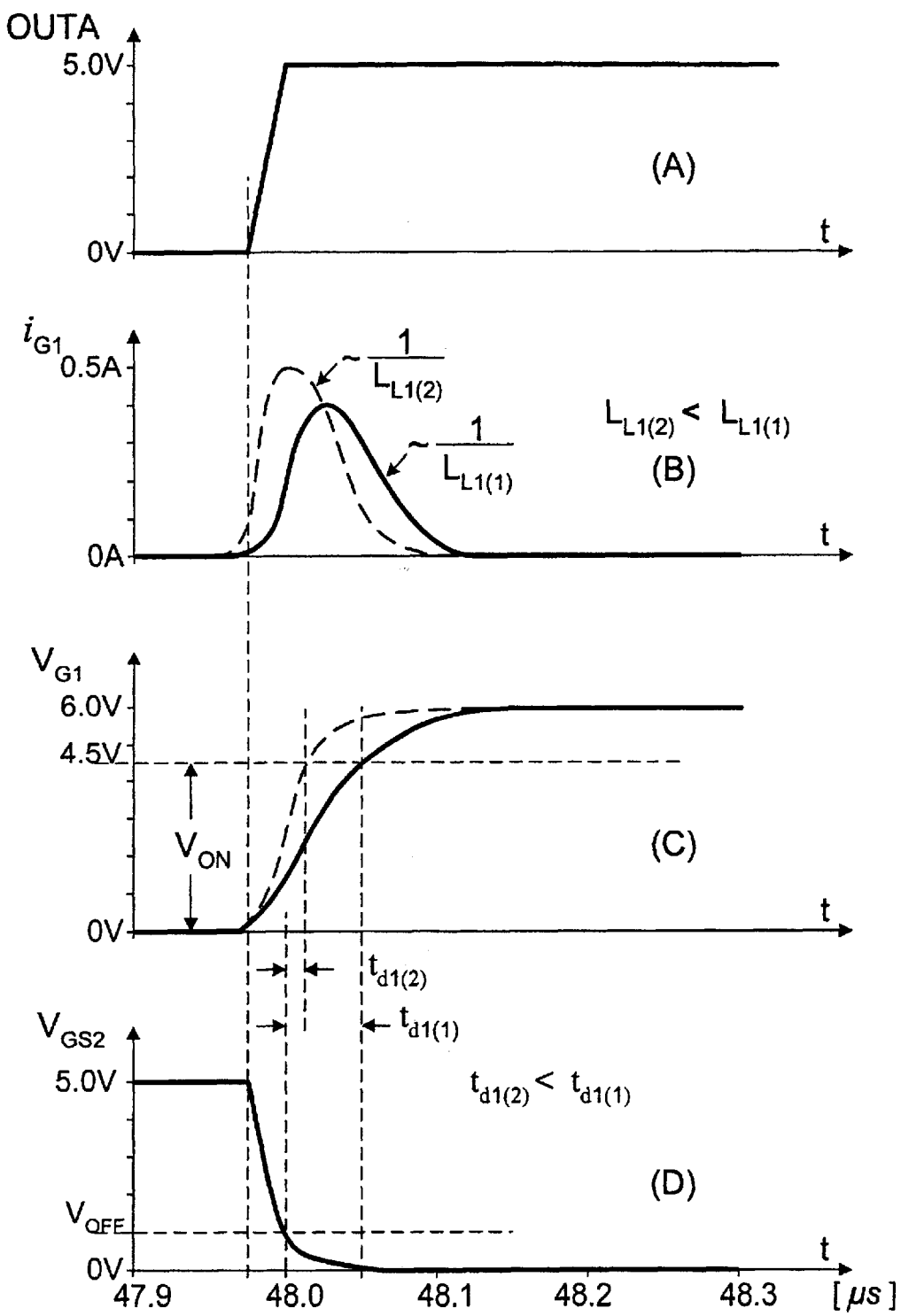
FIG. 3 shows the turn-on waveforms of the FIG. 1 circuit with reduced leakage inductance on one winding.

The turn-on waveforms of transistor $Q_1$ are shown in more detail in FIG. 3 for two different values of leakage inductance $L_1$ ($L_{1(1)}$ and $L_{1(2)}$) in order to explain the turn-on delay of primary switch $Q_1$ due to the finite rise time of the current in leakage inductance $L_1$ of winding $N_1$. The same consideration applies to primary switch $Q_2$. The lower value of leakage inductance $L_1$, denoted $L_{1(2)}$, allows a higher peak current for charging input capacitance of transistor $Q_1$ and consequently a faster turn-on of $Q_1$ and shorter delay between the turning-off of $S_2$ and turning-on of $Q_1$. Note that $V_{ON}$ in the (C) portion of FIG. 3 represents the voltage level of $V_{G1}$ at which $Q_1$ is fully on, and $t_{d1}$ (divided into $t_{d1(1)}$ and $t_{d(2)}$) is the so called "dead-time" and represents the time during which both synchronous rectifier $S_2$ and primary switch $Q_1$ are off. This dead-time is necessary in order to avoid cross conduction of synchronous rectifier $S_2$ and primary switch $Q_1$ (and $S_1$ and $Q_2$). A dead-time that is too long is not desirable since during this time the body diode of $S_2$ (and equivalently, $S_1$) is carrying half of the output inductor current, thus decreasing the efficiency of the converter. If the dead-time is too short, that is, $Q_1$ is on before $S_2$ is turned-off, there will still be cross-conduction which will result in efficiency drop. Therefore, it is important to have a well controlled dead-time in order to achieve the highest efficiency. With proper design of leakage inductances and repeatability in manufacturing, dead-time is optimized for maximum efficiency.

Figure 4:
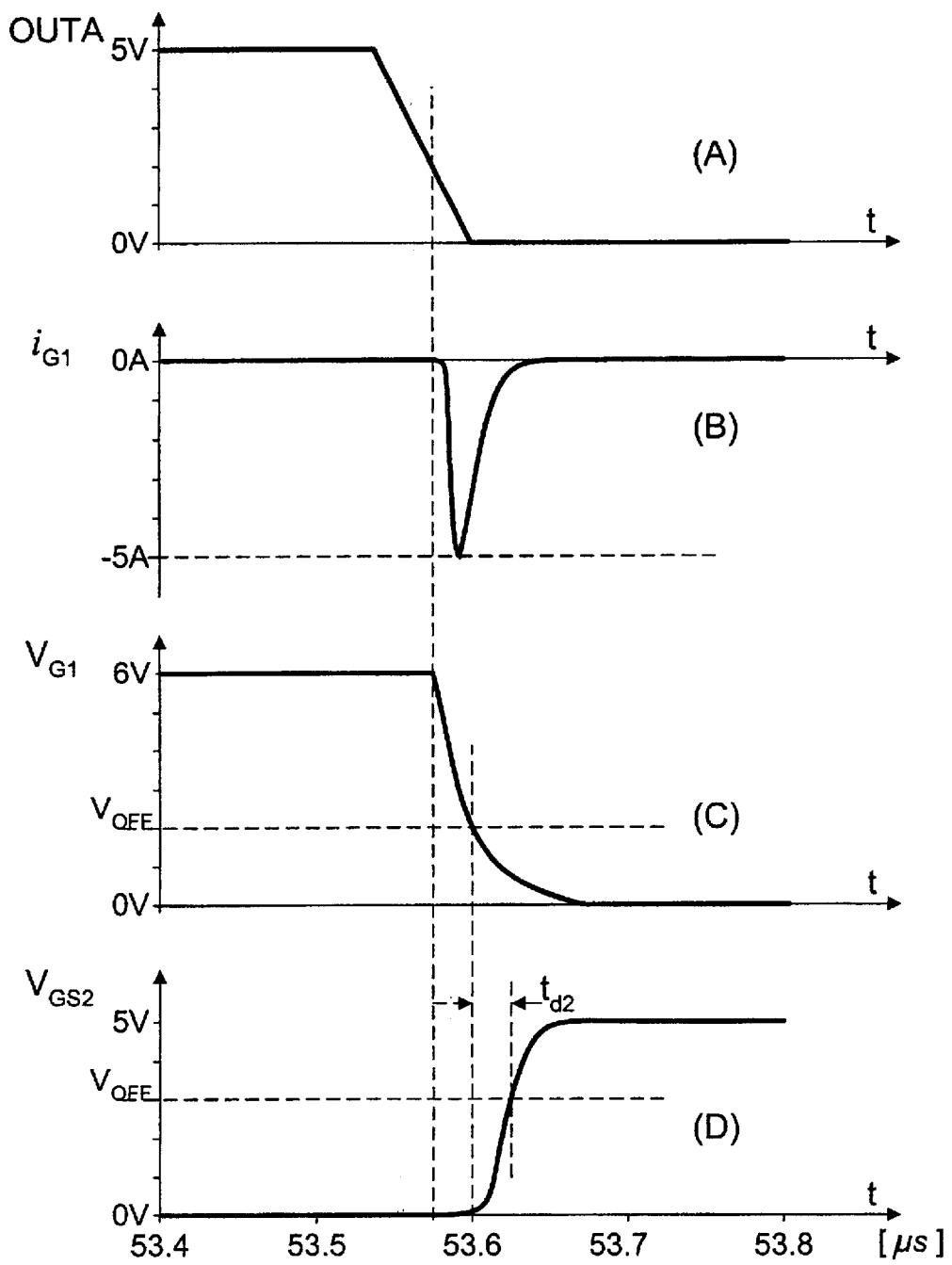
FIG. 4 shows the turn-off waveforms of the FIG. 1 embodiment.

The turn-off waveforms for transistor $Q_1$ (that also apply for $Q_2$) are shown in further detail in FIG. 4. Since diode $D_1$ becomes reverse biased when OUTA goes low, the discharging current of the input capacitance of $Q_1$ goes through transistor $Q_3$ and is limited, in first approximation, only by the resistance and turn-on characteristics of $Q_3$ but it is not affected by leakage inductance $L_1$ of winding $N_1$. In this manner, a very fast and well-controlled turn-off of $Q_1$ (as well as of $Q_2$) can be achieved. By varying the resistance of switch $Q_3$, the turn-off performance of primary switch $Q_1$ can be adjusted to a preferred value.

While the turn-on of primary switches $Q_1$ and $Q_2$ are delayed (slowed down) by leakage inductances $L_1$ and $L_2$ respectively, turn-off is very fast due to switches $Q_3$ and $Q_4$ and their low resistance. By placing switches $Q_3$ and $Q_4$ physically close to switches $Q_1$ and $Q_2$, maximum speed for turning off switches $Q_1$ and $Q_2$ is achieved. Note that the turn-off performance of switches $Q_1$ and $Q_2$ is not affected by leakage inductances $L_1$ and $L_2$, which allows independent control of turn-on and turn-off transients. Also, it is preferable for EMI (electromagnetic interference) purposes to have the turn-on of switches $Q_1$ and $Q_2$ slowed down.

Figure 5:
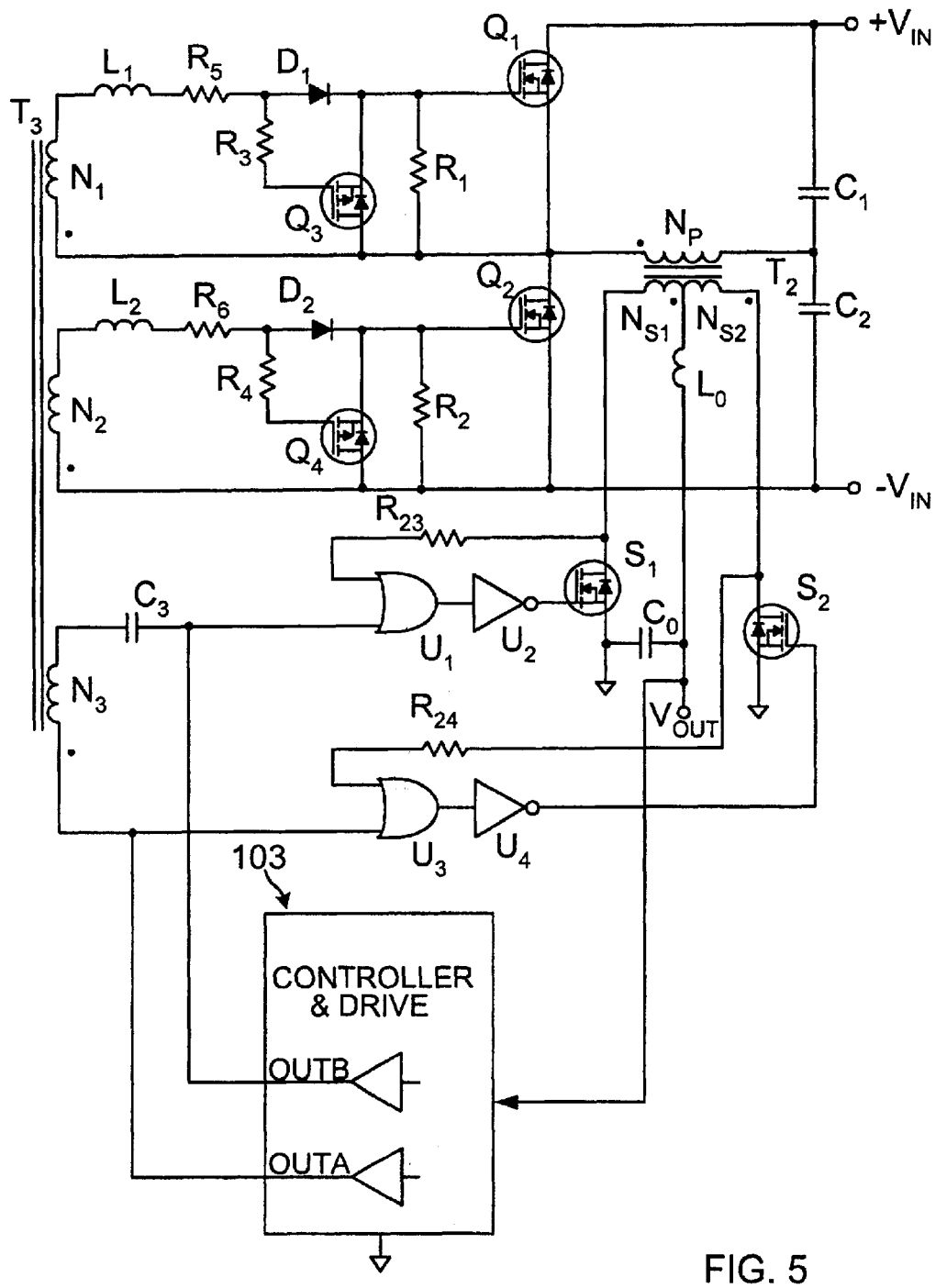
FIG. 5 is an alternative circuit embodiment of the invention with the feedback and control circuit referenced to the secondary (output) side.

As an alternative, if the control circuit and the drive circuit are on the secondary side of the converter (referenced to the output of the converter), windings $N_3$ and $N_4$ can be merged, thus eliminating one winding from the FIG. 1 embodiment, as shown in FIG. 5. In this case, OUTA and OUTB outputs are directly connected to one input of logic gates $U_3$ and $U_1$, respectively. Resistors $R_3$ and $R_4$ are in series with the gates of switches $Q_3$ and $Q_4$ in order to dampen any undesirable oscillations caused between the input capacitance of $Q_3$ and $Q_4$ and the leakage inductance in corresponding windings $N_1$ and $N_2$. Resistors $R_5$ and $R_6$ are to dampen oscillations on the gates of $Q_1$ and $Q_2$, respectively, caused by resonance between the leakage inductance $L_1$ and the input capacitance of $Q_1$, and leakage inductance $L_2$ and input capacitance of $Q_2$. Resistors $R_3$ through $R_6$ are not shown in FIG. 1 for simplicity of circuit description but would be present for practical realization of the circuit. Note that the salient waveforms in FIG. 2 are still applicable for the circuit of FIG. 5. Also for simplicity only block 103 (incorporating a controller, drive and protection circuitry, as well as regulation circuitry) is shown in FIG. 5. Its specific realization is insignificant to the invention. A significant difference of the FIG. 5 embodiment is to configure the output driver stages, OUTA and OUTB, logic gates $U_1$ and $U_3$, and drivers $U_2$ and $U_4$ as described. The operating principles correspond to those of the FIG. 1 embodiment. The supply voltage for controller 103 and $U_1$ through $U_4$ are referenced to the output of the converter and can be generated in different ways that are not relevant for the operation of the drive circuit.

Figure 6:
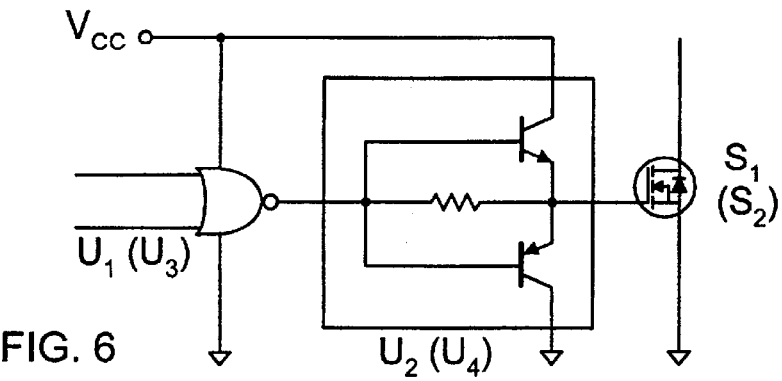
FIG. 6 is a partial circuit diagram for a possible realization of a driver for the synchronous rectifiers of embodiments of the invention.
Figure 7:
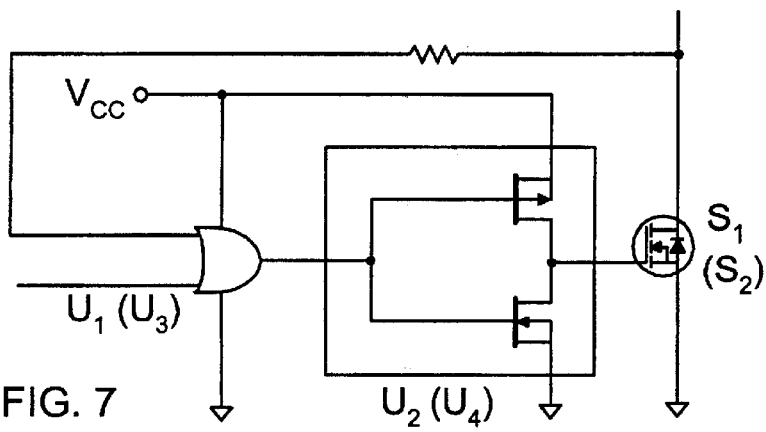
FIG. 7 is an alternative circuit diagram for a possible embodiment of a driver for the synchronous rectifiers of embodiments of the invention.
Figure 8:
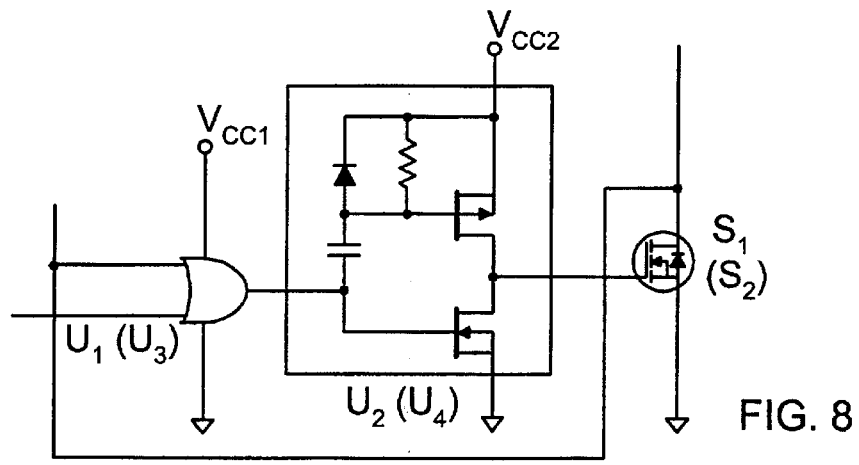
FIG. 8 is yet another partial circuit diagram for a possible realization of a driver for the synchronous rectifiers of embodiments of the invention.

Illustrated in FIGS. 6, 7 and 8 are partial circuitry embodiments for the possible realization of drivers $U_2$ and $U_4$. In FIG. 6, logic gate $U_1$ ($U_3$) is a NOR gate instead of an OR gate since driver stage $U_2$ ($U_4$) is non-inverting. Both drivers $U_2$ and $U_4$ are identical. In FIGS. 7 and 8, driver stage $U_2$ ($U_4$) is inverting and logic gate $U_1$ ($U_3$) is an OR gate as in FIGS. 1 and 5. In FIG. 8, the driver stage $U_2$ ($U_4$) allows synchronous rectifier $S_1$ ($S_2$) to be driven with a voltage higher than the supply voltage for logic gate $U_1$ ($U_2$). Similarly, driver $U_4$ functions in the same manner with synchronous rectifier $S_2$. Practical realizations of drivers $U_2$ and $U_4$ different from those in FIGS. 6 through 8 are also possible.

Figure 9:
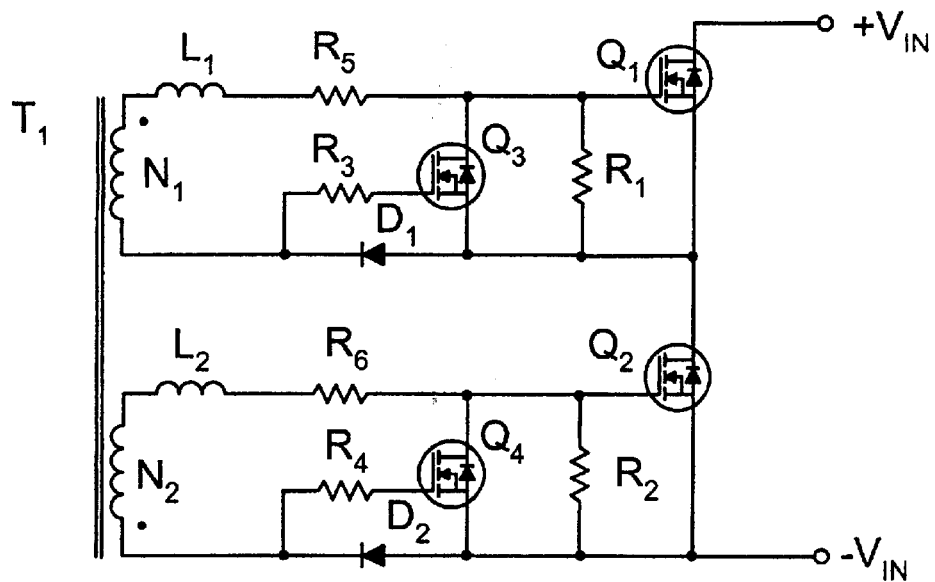
FIG. 9 is a partial circuit diagram for a possible realization of drivers of the primary side switches with n- channel MOSFETs.
Figure 10:
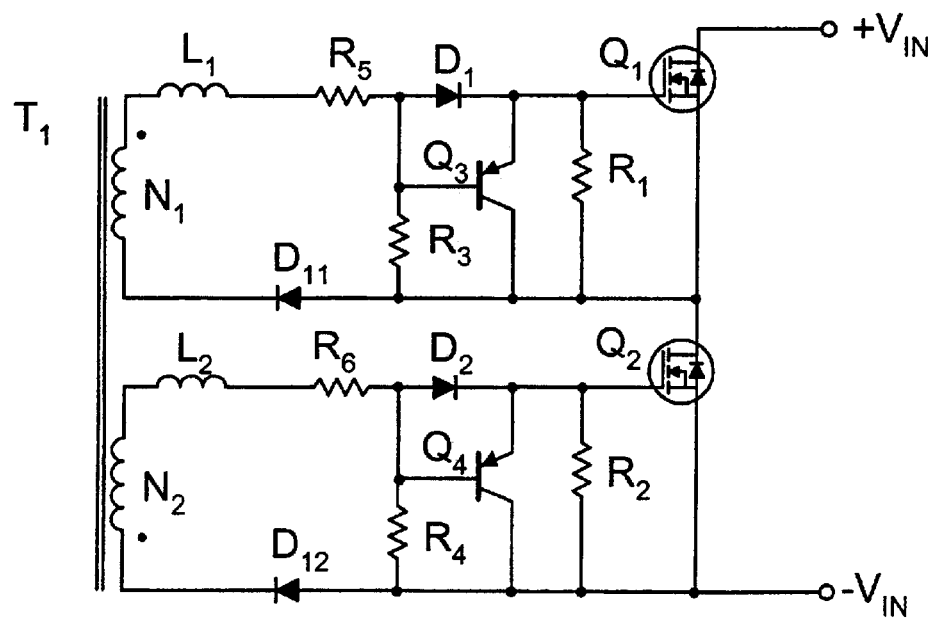
FIG. 10 is another partial circuit diagram for a possible realization of drivers of the primary side switches with bipolar transistors.

Even though transistors $Q_3$ and $Q_4$ (in FIGS. 1 and 5) are shown as p-channel MOSFETs, it is possible to use n-channel MOSFETs as well as bipolar transistors. The former are more practical than the latter due to easier drive and an integrated body diode, which would be needed as an external component if switches $Q_3$ and $Q_4$ were bipolar transistors. An embodiment realization using n-channel MOSFETs as $Q_3$ and $Q_4$ from FIGS. 1 and 5 is shown in FIG. 9. When p-n-p bipolar transistors are used for switches $Q_3$ and $Q_4$, two additional diodes $D_{11}$ and $D_{12}$ would be needed as shown in FIG. 10. Diodes $D_{11}$ and $D_{12}$ prevent shorting of windings $N_1$ and $N_2$ via the collector-emitter junction of $Q_3$ and $Q_4$, respectively. Note that if the circuit of FIG. 10 is used, positive voltage on the gates of transistors $Q_1$ and $Q_2$ will be for one diode voltage drop (typically about 0.5V) less than in the original FIG. 1 circuit.

If the control circuit is on the primary side, as in FIG. 1, it is desirable that there be a means to disable the converter from a condition sensed on the secondary side, for example, in case of output over-voltage or under-voltage conditions. Similarly, if the feedback and control circuit is referenced to the output of the converter, as in FIG. 5, it is desirable that there be a means to disable the converter from a condition sensed on the primary side, for example, in case of input over-voltage or under-voltage conditions or in order to turn the converter off. One solution, which has previously been employed is to use an opto-coupler, which has several disadvantages:

It cannot operate at temperatures above 85° C. (some are limited to 100° C.), and therefore will impose serious limitations on the temperature of the PCB which is also used as a means for cooling semiconductor devices and magnetic devices;

Unless it is fast (digital), the opto-coupler will not provide a fast disable of the control circuit, particularly in the case of output over-voltage condition when the controller is on the primary side and the converter operates at high switching frequency;

Opto-couplers are not available in small, low-profile packages. Thus, it will be the tallest component and will impose a limit on the low-profile design of the converter.

Another prior art solution has been to have a separate pulse transformer that will be used only for this function. The main drawbacks of this alternative are:

An additional component which needs to meet all safety requirements;

Extra space is required on the PCB, thus imposing limits on the minimum size of the PCB;

If there is no other use of this transformer it is not a practical solution.

Figure 11A:
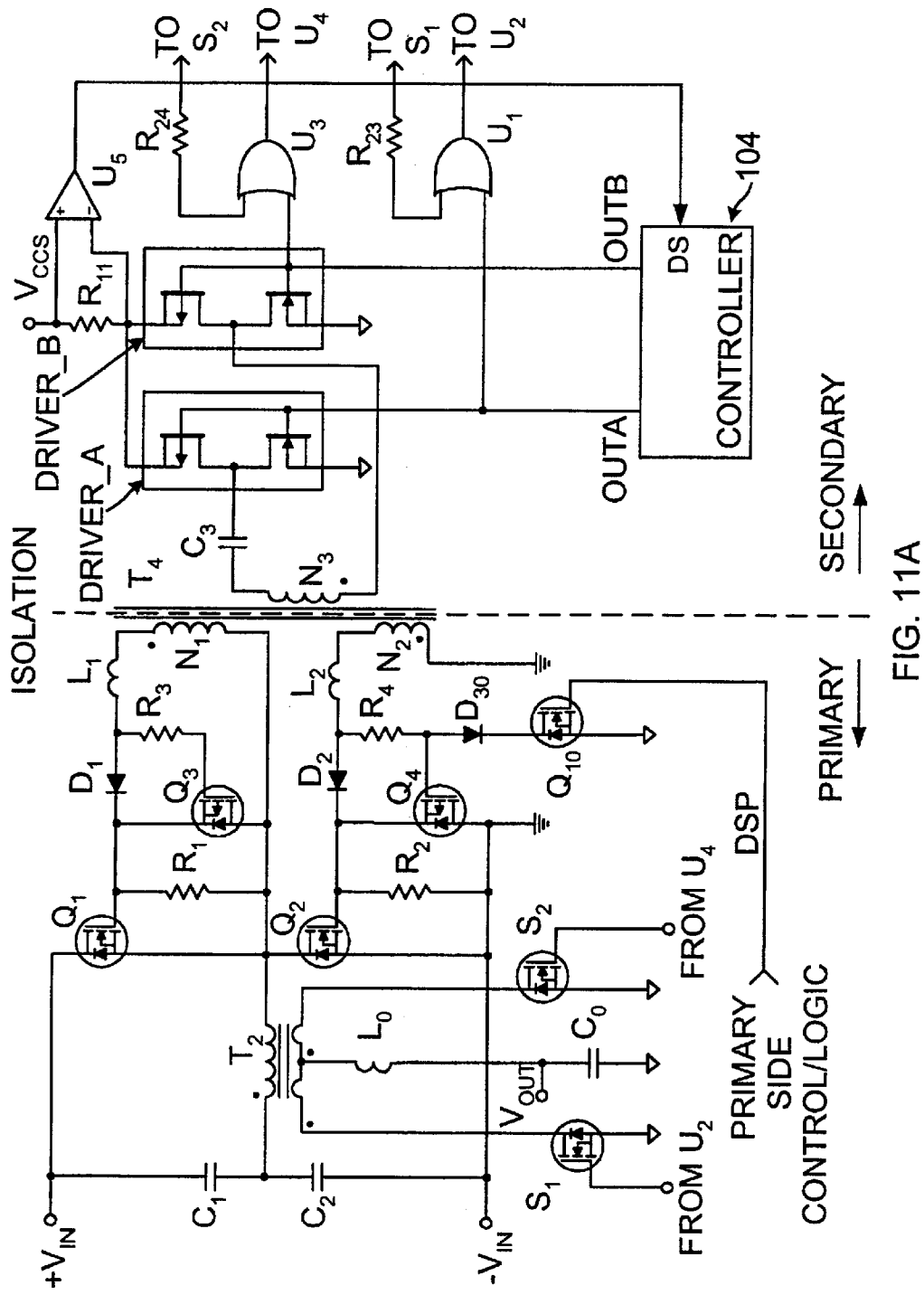
FIGS. 11A and 11B is an alternative circuit embodiments of the invention to facilitate disabling the control circuit on the secondary side from the primary side.
Figure 11B:
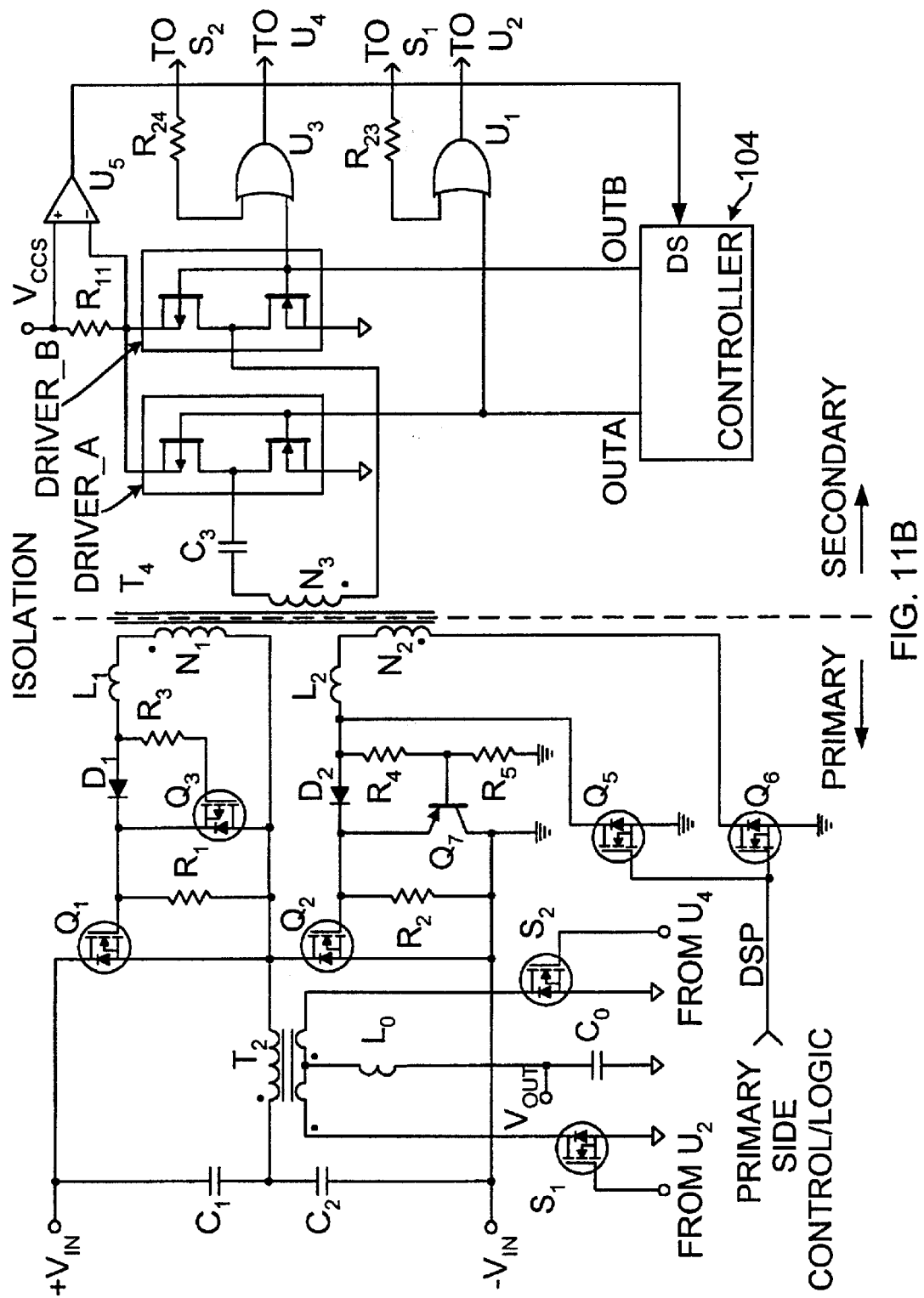
Figure 12:
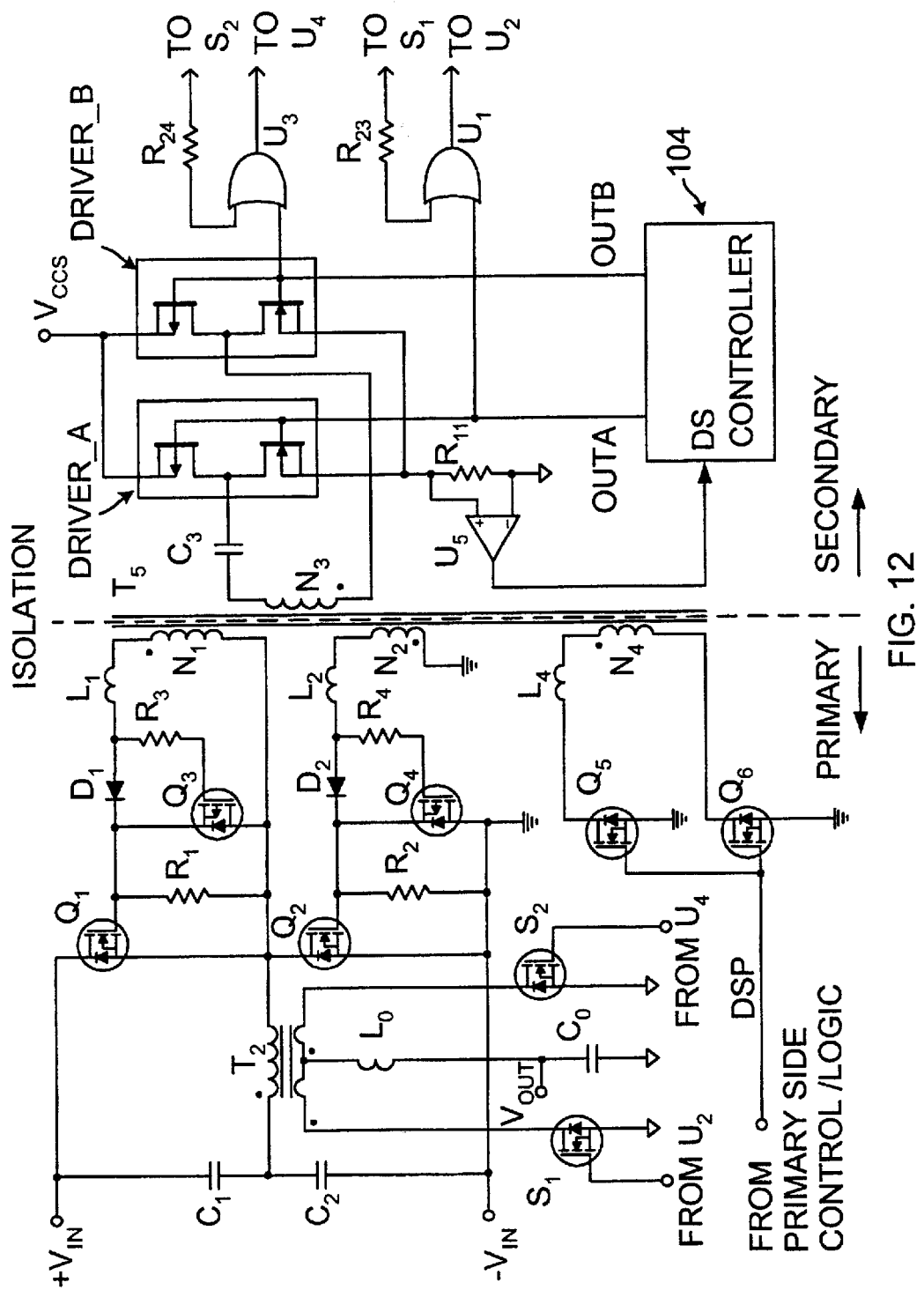
FIG. 12 another alternative circuit embodiment of the invention to facilitate disabling the control circuit on the secondary side from the primary side via additional winding.

An alternate solution disclosed herein provides, as shown in FIGS. 11A, 11B and 12, a means for disabling the control circuit on the secondary side from a condition sensed on the primary side as described in detail below. The principle idea is to short one of the windings of the drive transformer (FIGS. 11A and 11B), preferably one that is not floating ($N_2$), detect excessive current in winding $N_3$ due to a short in winding $N_2$ and disable the control circuit and drivers OUTA and OUTB resulting in turn-off of the converter. Another alternative solution is to use a separate winding on the drive transformer and short that winding (FIG. 12). Different circuit realizations are possible as is known to one of ordinary skill in the art.

The primary side protection logic, as shown in FIGS. 11A and 11B, initially senses a fault condition and generates a disable signal that is active (high logic level). Transistor $Q_{10}$ (FIG. 11A), shown as an n-channel MOSFET as an example, and diode $D_{30}$, form a voltage bi-directional switch, which means that current can flow only in one direction. Diode $D_{30}$ is necessary to prevent conduction in the body diode of transistor $Q_{10}$ when the voltage on winding $N_2$ is positive (the dot end of the winding is more positive than the opposite end) and therefore prevent shorting of winding $N_2$ during normal operation of the converter. In response to an active disable signal DSP, transistor $Q_{10}$ is turned-on and diode $D_{30}$ becomes forward biased when the voltage on winding $N_2$ is negative. Winding $N_2$ is then shorted which results in the turn-off of primary switch $Q_1$ and an increase in current through winding $N_3$, causing a voltage drop across resistor $R_{11}$ connected between supply voltage $V_{CCS}$ and drivers DRIVER_A and DRIVER_B referenced to the output of the converter. Note that a possible realization for DRIVER_A and DRIVER_B is shown in FIGS. 11A and 11B explicitly as complementary pairs of p-and n-channel MOSFETs. The voltage across resistor $R_{11}$ is sensed with comparator $U_5$ that has a threshold set such that in normal operation the voltage drop across resistor $R_{11}$ will not trip $U_5$. However, when winding $N_2$ is shorter, comparator $U_5$ is activated causing controller 104 to disable the converter by setting both outputs OUTA and OUTB low. Note that transistor $Q_{10}$ can be connected in parallel with switch $Q_4$ in which case the gate of primary switch $Q_2$ will be shorted in response to the active disable signal. As a consequence, winding $N_2$ will be shorted via $Q_{10}$ and diode $D_2$, similarly causing increased current through winding $N_2$. Diode $D_3$ (employed in the FIG. 1 embodiment) is not needed in this embodiment. A design characteristic of this solution is that the capacitance of $Q_{10}$ will affect the turn-on performance of $Q_2$. In order to achieve similar turn-on characteristics of both $Q_1$ and $Q_2$, leakage inductance $L_2$ is required to be less a $L_1$, thus resulting in a more complicated drive transformer design. Note that the disable circuit from FIG. 11A has an inherent delay of one switching period since shorting winding $N_2$ will affect the circuit only during the on-time of transistor $Q_1$. In most applications this should not be a problem.

An alternate solution to the FIG. 11A embodiment is shown in FIG. 11B. Two switches, $Q_5$ and $Q_6$, are added to short winding $N_2$ whenever signal DSP is active. Transistor $Q_4$ is replaced with p-n-p transistor $Q_7$ and resistor $R_5$ is added across the base to the collector of $Q_7$. When the voltage on winding $N_2$ is negative, diode $D_2$ and the body diode of $Q_6$ are forward biased and transistor $Q_2$ is on with a gate voltage reduced by the voltage drop across the body diode of $Q_6$ (typically about 0.8V). A feature of this embodiment is that there is a maximum delay of half the switching period and a stronger signal can be generated across resistor $R_{11}$, thus allowing a higher threshold for $U_5$ and improved noise immunity. A weakness is a lower gate voltage on primary switch $Q_2$. By adding a Shottky diode (not shown) across $Q_6$, the additional voltage drop could be reduced from about 0.8V to about 0.4V with that extra component.

As an additional embodiment, winding $N_4$ is added to drive transformer $T_1$, as shown in FIG. 12, and therefore serves two purposes:

(1) to provide means for disabling the secondary control circuit by shorting winding $N_4$ with two transistors $Q_5$ and $Q_6$; and (2) to provide regulated bias voltage to the primary control circuit after start-up.

FIG. 12 is very similar to FIG. 11B, with some additions. Transistors $Q_5$ and $Q_6$ are added across winding $N_4$, instead of winding $N_2$, in order to short the winding if the DSP signal is high to stop the controller on the secondary side immediately whenever a fault condition on the primary side of the converter is detected. In this configuration, the controller is also on the secondary side and the only communication between the primary and secondary control circuit is via drive transformer $T_5$. Thus, there is no need for extra components with high voltage isolation (for example, opto-coupler or pulse transformer).

Resistor $R_{11}$ (FIG. 12) is now positioned in the return path of DRIVER_A and DRIVER_B as another embodiment and an alternate solution to FIG. 11B. If winding $N_4$ is shorted by transistors $Q_5$ and $Q_6$, excessive current will flow via resistor $R_{11}$ and comparator $U_5$ will generate signal DS to stop the controller, thus turning off the entire converter. Note that the disable circuit from FIG. 12 has an inherent delay of one-half of the switching period since shorting winding $N_4$ affects the circuit during the on-time of both transistors $Q_1$ and $Q_2$.

Winding $N_4$ has the best coupling with winding $N_3$, while windings $N_2$ and $N_1$ are preferably placed in layers above and below in the PCB. This is the preferred structure because it provides enough leakage between $N_3$ and $N_1$ and $N_2$, and also decouples $N_1$ and $N_2$ from $N_3$ when $N_4$ is shorted.

Figure 13A:
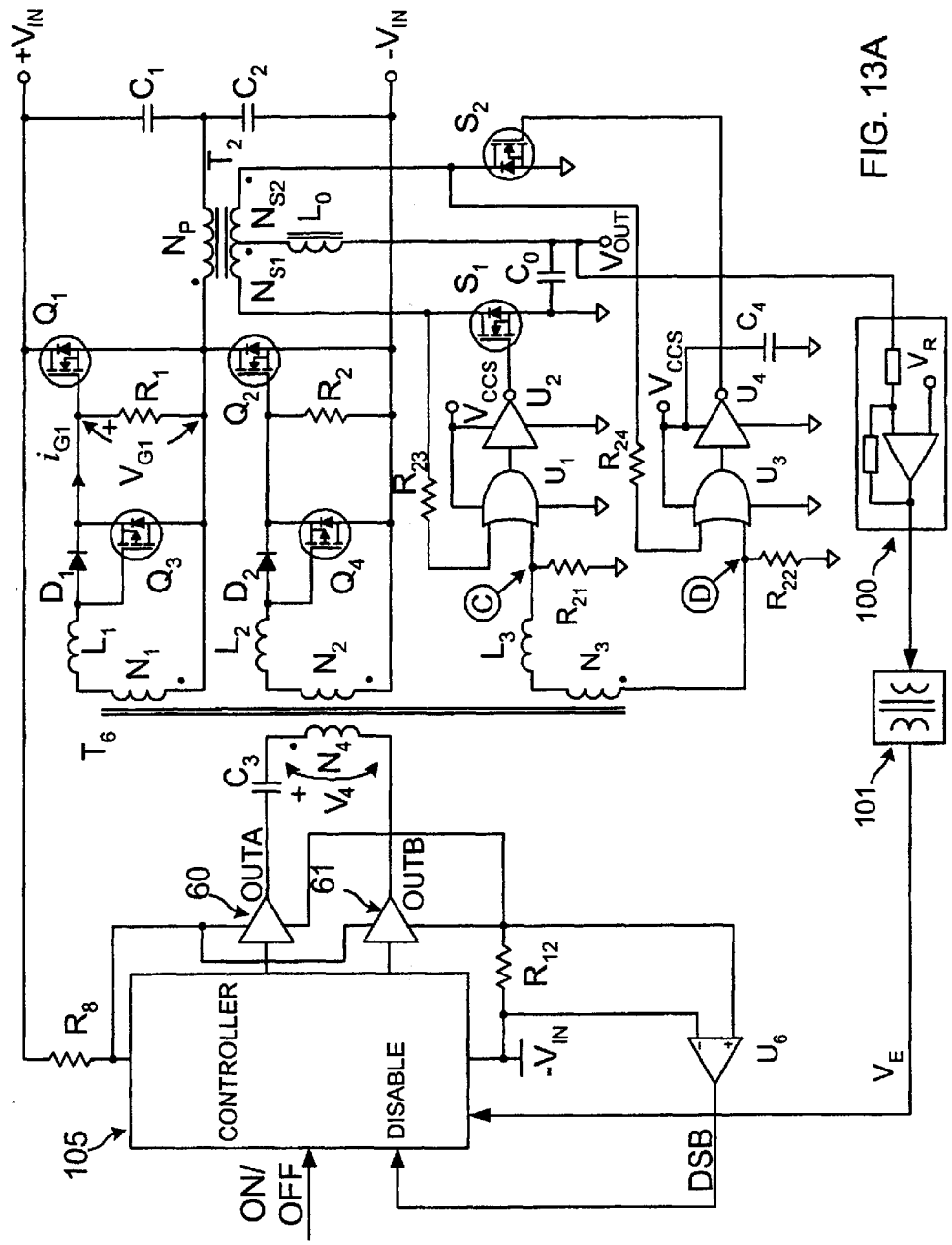
FIG. 13A is another circuit embodiment of the invention with a disable feature and the control circuit located on the input side of the converter.
Figure 13B:
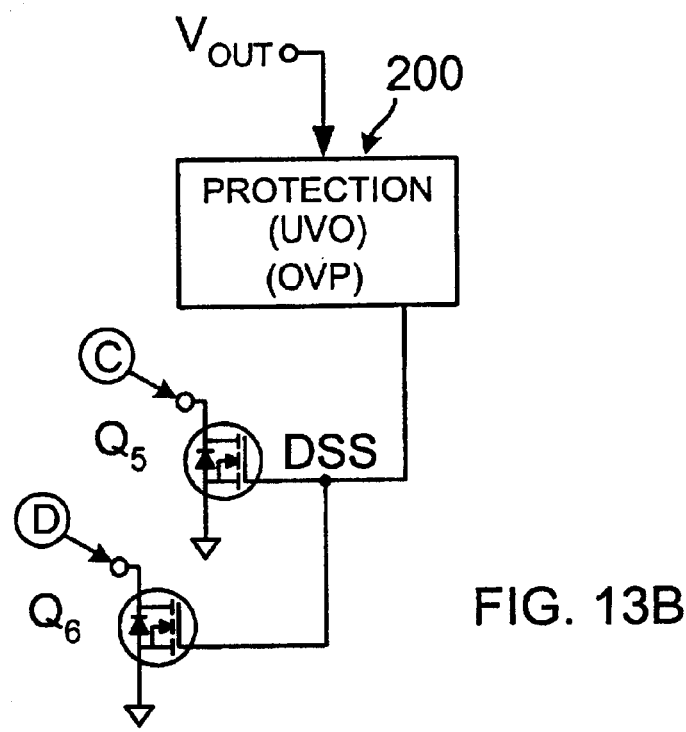
FIG. 13B shows means to disable the converter of FIG. 13A from a condition sensed on the output side.

Another embodiment of the invention with the control circuit on the input side of the converter is shown in FIG. 13A in which the disable from the output side is provided by shorting winding $N_3$. Protection logic 200 (FIG. 13B, referenced to the output of the converter), generates signal DSS whenever the converter needs to be disabled (for example, in case of over-voltage on the output, under-voltage or any other irregular operating condition). Active signal DSS turns-on transistors $Q_5$ and $Q_6$ (FIG. 13B), which in turn shorts winding $N_3$ of drive transformer $T_6$. The current in winding $N_4$ is indirectly measured with resistor $R_{12}$ which is connected in the return path of drivers 60 and 61, which are shown as separate components in FIG. 13A, instead of as internal parts of controller 102 in FIG. 1. Note that drivers 60 and 61, can still be internal parts of controller 105, in which case sensing resistor $R_{12}$ will measure the total current of the controller and can be placed either in a path to ground or at the+$V_{IN}$ location. The voltage across resistor $R_{12}$ is sensed with comparator $U_6$ with a threshold that is set such that in normal operation the voltage drop across resistor $R_{12}$ will not trip $U_6$. However, when winding $N_3$ is shorted, comparator $U_6$ is tripped and, in turn, generates signal DSB that disables controller 105, drivers 60 and 61, and consequently the converter.

It should be understood that the foregoing embodiments are exemplary for the purpose of teaching the inventive aspects of the present invention that are covered solely by the appended claims and encompass all variations not regarded as a departure from the scope of the invention. It is likely that modifications and improvements will occur to those of ordinary skill in the art are intended to be included within the scope of the following claims and their equivalents.

What is claimed is:

1. A switch-mode power converter for converting an input voltage from an input source to an output voltage for supply to a load, the power converter comprising:
    a power isolation transformer having a primary winding and split first and second secondary windings;
    a primary converter circuit connected to said primary winding of said power transformer, said primary converter circuit comprising at least a first and a second primary controllable power switch each said switch having two control terminals for alternatively supplying the input voltage to said primary winding of said power isolation transformer to produce a substantially symmetric current in said primary winding;
    a full wave secondary converter circuit fully isolated from said primary converter circuit and comprising first and a second synchronous rectifiers, said synchronous rectifiers being individually switchable and each being connected between a respective one of said first and second secondary windings and the load; at least a first and a second primary switch control circuit controlling the conduction of said first and second primary controllable power switches;
    synchronous rectifier control circuits controlling conduction of said each first and second synchronous rectifiers;
    a switch conduction control circuit with two outputs having substantially symmetrical waveforms shifted by about 180 degrees for controlling the conduction of said primary controllable power switches and said first and second synchronous rectifiers; and
    a drive transformer used for providing necessary delays between conductions of said primary controllable power switches and said first and second synchronous rectifiers as well as providing power for controlling said primary controllable power switches and said first and second synchronous rectifiers, said drive transformer providing isolation between said primary switch control circuits and said synchronous rectifier control circuits, and said drive transformer comprising:
        a first drive transformer winding connected to said switch conduction control circuit; and
        a second drive transformer winding connected to said first primary switch control circuit, said second drive transformer winding controlling the conduction of said first primary controllable power switch.

2. The power converter recited in claim 1, and further comprising:
    a third drive transformer winding connected to said second primary switch control circuit, said second primary switch control circuit controlling the conduction of said second primary controllable power switch; and
    a fourth drive transformer winding connected to said synchronous rectifier control circuits.

3. The power converter recited in claim 1, wherein said switch conduction control circuit is also connected to one end of said input voltage.

4. The power converter recited in claim 2, wherein said second and said third drive transformer windings further comprise leakage inductances associated with said drive transformer windings, said leakage inductances being carefully selected and designed in order to achieve optimum delay in turning-on said primary controllable power switches.

5. The power converter recited in claim 1, wherein said each primary switch control circuit further comprises:
    at least one controllable switch connected across said control terminals of said primary controllable power switch, said controllable switch being configured to effectively control and provide turn-off of said primary controllable power switch sufficiently quickly to prevent cross conduction of said primary controllable power switches in case of near equal conduction times; and
    a diode configured to control and provide turn-on of said primary controllable power switch and to control and provide turn-on of said controllable switch.

6. The power converter recited in claim 5, wherein said at least one controllable switch is physically located close to said first and second primary controllable power switches to enhance turn-off of said primary controllable power switches.

7. The power converter recited in claim 2, wherein said each synchronous rectifier control circuit further comprises:
    at least one two input logic circuit to control conduction of said each synchronous rectifier with relatively small input capacitance so that the leakage inductance of said fourth transformer winding does not adversely affect the delay in turning off said synchronous rectifier, wherein one input of said two input logic circuit is connected to one end of said drive transformer winding connected to said synchronous rectifier control circuits, and the second input of said two input logic circuit is connected to the corresponding synchronous rectifier in order to prevent turning-on of said synchronous rectifier before voltage across said synchronous rectifier drops to a predetermined value; and a driver circuit connected to said each synchronous rectifier providing optimum turn-on of said synchronous rectifier and providing optimum turn-off of said synchronous rectifier with minimum delay.

8. The power converter recited in claim 7, wherein said two input logic circuit comprises protective diodes on each of said two inputs in order to provide negative or positive voltage greater than supply voltage to be applied across each said input of said two input logic circuit.

9. The power converter recited in claim 8, wherein said two input logic circuit further comprises series resistors in each of said two inputs in order to limit current in said protective diodes whenever negative or positive voltage greater than supply voltage is applied across each said input of said two input logic circuit.

10. The power converter recited in claim 2, wherein said switch conduction control circuit is referenced to said output of said power isolation transformer, thereby allowing said fourth drive transformer winding connected to said synchronous rectifier control circuits and said first drive transformer winding connected to said switch conduction control circuit with two outputs with about 180 degrees shift to be combined, thereby eliminating one winding in said drive transformer.

11. The power converter recited in claim 10, wherein said switch conduction control circuit is connected to said synchronous rectifier control circuits.

12. The power converter recited in claim 3, further comprising means for disabling the power converter on the input side and thus also the output side from a condition sensed on the output side.

13. The power converter recited in claim 3, and further comprising means for enabling the power converter on the input side from a condition sensed on the output side.

14. The power converter recited in claim 11, further comprising means to disable the switch-mode power converter from the output side of said switch-mode power converter in response to a condition sensed on the input side of said switch-mode power converter.

15. A switch-mode power converter for converting an input voltage from an input source to an output voltage for supply to a load, the power converter comprising:
a power isolation transformer having a primary winding and a secondary winding;
a primary converter circuit connected to said primary winding of said power transformer, said primary converter circuit comprising at least a first and a second primary controllable power switch, each said switch having two control terminals for alternatively supplying the input voltage to said primary winding of said power isolation transformer to produce a substantially symmetric current in said primary winding;
a full wave secondary converter circuit fully isolated from said primary converter circuit and comprising first and second synchronous rectifiers, said synchronous rectifiers being individually switchable and each being connected between a respective end of said second secondary windings and the load;
at least a first and a second primary switch control circuit controlling the conduction of said first and second primary controllable power switches;
synchronous rectifier control circuits controlling conduction of said each first and second synchronous rectifiers;
a switch conduction control circuit with two outputs having substantially symmetrical waveforms shifted by about 180 degrees for controlling the conduction of said primary controllable power switches and said first and second synchronous rectifiers; and
a drive transformer used for providing necessary delays between conductions of said primary controllable power switches and said first and second synchronous rectifiers as well as providing power for controlling said primary controllable power switches and said first and second synchronous rectifiers, said drive transformer providing isolation between said primary switch control circuits and said synchronous rectifier control circuits, and said drive transformer comprising:
a first drive transformer winding connected to said switch conduction control circuit; and
a second drive transformer winding connected to said first primary switch control circuit, said second drive transformer winding controlling the conduction of said first primary controllable power switch.

16. The power converter recited in claim 15, and further comprising: third drive transformer winding connected to said second primary switch control circuit, said second primary switch control circuit controlling the conduction of said second primary controllable power switch; and
a fourth drive transformer winding connected to said synchronous rectifier control circuits.

17. The power converter recited in claim 15, wherein said switch conduction control circuit is also connected to one end of said input voltage.

18. The power converter recited in claim 16, wherein said second and said third drive transformer windings further comprise leakage inductances associated with said drive transformer windings, said leakage inductances being carefully selected and designed in order to achieve optimum delay in turning-on said primary controllable power switches.

19. The power converter recited in claim 15, wherein said each primary switch control circuit further comprises:
at least one controllable switch connected across said control terminals of said primary controllable power switch, said controllable switch being configured to effectively control and provide turn-off of said primary controllable power switch sufficiently quickly to prevent cross conduction of said primary controllable power switches in case of near equal conduction times; and
a diode configured to control and provide turn-on of said primary controllable power switch and to control and provide turn-on of said controllable switch.

20. The power converter recited in claim 19, wherein said at least one controllable switch is physically located close to said first and second primary controllable power switches to enhance turn-off of said primary controllable power switches.

21. The power converter recited in claim 16, wherein said each synchronous rectifier control circuit further comprises:
at least one two input logic circuit to control conduction of said each synchronous rectifier with relatively small input capacitance so that the leakage inductance of said fourth transformer winding does not adversely affect the delay in turning off said synchronous rectifier, wherein one input of said two input logic circuit is connected to one end of said drive transformer winding connected to said synchronous rectifier control circuits, and the second input of said two input logic circuit is connected to the corresponding synchronous rectifier in order to prevent turning-on of said synchronous rectifier before voltage across said synchronous rectifier drops to a predetermined value; and a driver circuit connected to said each synchronous rectifier providing optimum turn-on of said synchronous rectifier and providing optimum turn-off of said synchronous rectifier with minimum delay.

22. The power converter recited in claim 21, wherein said two input logic circuit comprises protective diodes on each of said two inputs in order to provide negative or positive voltage greater than supply voltage to be applied across each said input of said two input logic circuit.

23. The power converter recited in claim 22, wherein said two input logic circuit further comprises series resistors in each of said two inputs in order to limit current in said protective diodes whenever negative or positive voltage greater than supply voltage is applied across each said input of said two input logic circuit.

24. The power converter recited in claim 16, wherein said switch conduction control circuit is referenced to said output of said power isolation transformer, thereby allowing said fourth drive transformer winding connected to said synchronous rectifier control circuits and said first drive transformer winding connected to said switch conduction control circuit with two outputs with about 180 degrees shift to be combined, thereby eliminating one winding in said drive transformer.

25. The power converter recited in claim 24, wherein said switch conduction control circuit is connected to said synchronous rectifier control circuits.

26. The power converter recited in claim 17, further comprising means for disabling the power converter on the input side and thus also the output side from a condition sensed on the output side.

27. The power converter recited in claim 17, and further comprising means for enabling the power converter on the input side from a condition sensed on the output side.

28. The power converter recited in claim 25, further comprising means to disable the switch-mode power converter from the output side of said switch-mode power converter in response to a condition sensed on the input side of said switch-mode power converter.

29. A method of converting an input voltage from an input power source to an output voltage to supply to a load employing a circuit having a power isolation transformer having a primary winding, a drive transformer, primary controllable power switches, synchronous rectifiers, and controllable switches, the method comprising the steps of:

converting power from one form to another form using the power isolation transformer;

isolating the input power from the output voltage;

alternating the conduction of the primary controllable power switches for alternatively supplying the input voltage to said primary winding of said power isolation transformer to transfer energy from the input to the output;

alternating the conduction of synchronous rectifiers to rectify and provide dc output voltage;

supplying power to said primary controllable power switches and said synchronous rectifiers;

cycling said primary controllable switches on and off;

delaying the turn-on of said primary controllable power switches using the leakage inductances associated with the windings of said drive transformer and the input capacitance of the primary controllable power switches;

delaying the turn-on of said synchronous rectifiers until sensed voltage across said synchronous rectifiers drops to a predetermined value;

ensuring minimum delay in turn-off of said primary controllable power switches so that the switching delay of said controllable switch is not affected by the leakage inductance of associated drive transformer winding, thereby allowing fast turn-off of said primary controllable power switch connected to a drive transformer winding; and ensuring minimum delay in turn-off of said synchronous rectifiers so that the switching delays are not affected by the leakage inductance of the associated drive transformer winding connected to said synchronous rectifier control circuits.

30. The method recited in claim 29, and further comprising the step of: powering and controlling said drive transformer and associated circuits using a switch conduction control circuit.

31. A method for disabling a switch-mode power converter having a drive transformer and a switch conduction control circuit referenced to the input of the power converter from a condition sensed on the output of the power converter, the method comprising the steps of:

sensing a condition on the output of the power converter that requires the power converter to be disabled;

shorting a drive transformer winding connected to circuitry referenced to the output side of the power converter;

detecting excessive current across a drive transformer winding connected to said switch conduction control circuit connected to the input side of the power converter; and sending a signal to disable the switch conduction control circuit, thus disabling the converter.

32. A method for disabling a switch-mode power converter having a drive transformer and a switch conduction control circuit referenced to the output of the power converter from a condition sensed on the input of the power converter, the method comprising the steps of:

sensing a condition on the input of the power converter that requires the power converter to be disabled;

shorting a drive transformer winding connected to circuitry referenced to the input side of the power converter;

detecting excessive current across a drive transformer winding connected to the switch conduction control circuit connected to the output side of the power converter; and sending a signal to disable the switch conduction control circuit, and thus disabling the converter.

33. A drive transformer and associated circuitry used to power switch control circuitry in switchmode power converters, the drive transformer and associated circuitry comprising at least one drive transformer winding to power at least one primary switch control circuit connected to and controlling the conduction of a plurality of primary controllable switches, said at least one transformer winding having an associated leakage inductance carefully selected and designed in order to achieve optimum delay of the turn-on of said primary switches.

* * * * *